US008903654B2

(12) United States Patent
Covello et al.

(10) Patent No.: US 8,903,654 B2
(45) Date of Patent: Dec. 2, 2014

(54) NON-CAUSAL ATTITUDE ESTIMATION FOR REAL-TIME MOTION COMPENSATION OF SENSED IMAGES ON A MOVING PLATFORM

(75) Inventors: James A. Covello, Tucson, AZ (US); Angel D. Laracuente, Sahuarita, AZ (US); Tormod Fretheim, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 170 days.

(21) Appl. No.: 13/528,392

(22) Filed: Jun. 20, 2012

(65) Prior Publication Data
US 2013/0345973 A1 Dec. 26, 2013

(51) Int. Cl.
G01C 21/10 (2006.01)

(52) U.S. Cl.
USPC ............. 701/509; 701/4; 382/100; 382/260

(58) Field of Classification Search
USPC .............. 701/3, 7, 468, 470, 472, 4, 509; 340/967; 224/164, 171; 382/100, 260
See application file for complete search history.

(56) References Cited

U.S. PATENT DOCUMENTS 6,000,661 A * 12/1999 Price et al. .................. 244/164
6,826,478 B2 * 11/2004 Riewe et al. ................ 701/470
6,863,244 B2 * 3/2005 Fowell et al. ............... 244/171
6,999,005 B2 * 2/2006 Okada et al. ................ 340/967
7,171,303 B1 * 1/2007 Nordmark et al. ........... 701/472
7,308,342 B2 * 12/2007 Greenfeld et al. ............. 701/3
7,447,591 B2 * 11/2008 Belenkii et al. ............. 701/468
7,468,695 B1  12/2008 Williams
7,729,816 B1  6/2010 Josselson
7,970,500 B2 * 6/2011 Parra Carque ................. 701/7
2011/0007167 A1  1/2011 Katake

FOREIGN PATENT DOCUMENTS

WO 2007061950 A1 5/2007
WO 2011120141 A1 10/2011

* cited by examiner

Primary Examiner — John Q Nguyen
Assistant Examiner — Aaron Smith
(74) Attorney, Agent, or Firm — Eric A. Gifford

(57) ABSTRACT

An attitude estimator provides non-causal attitude estimates for real-time motion compensation of sensed images on a moving platform. A non-causal filter processes uncompensated attitude samples received with a latency from an IMU at a high rate clock to provide an attitude estimate that is strictly non-causal but satisfies a just-in-time (JIT) criteria for real-time motion compensation of images captured at a low rate clock. On-average the error of the non-causal attitude estimate is less than the error of a causal attitude estimate. If the lag added by the non-causal filter is greater than the latency, the effective transfer function of the non-causal filter has a negative gain slope that attenuates high frequency noise of the uncompensated attitude samples. The attitude estimator may also include a causal filter to generate a causal attitude estimate for real-time active stabilization of the image sensor at the high rate clock.

20 Claims, 7 Drawing Sheets

NON-CAUSAL ATTITUDE ESTIMATION FOR REAL-TIME MOTION COMPENSATION OF SENSED IMAGES ON A MOVING PLATFORM

GOVERNMENT RIGHTS

This invention was made with United States Government support under Contract Number N00019-07-C-0008 with the Department of the Navy. The United States Government has certain rights in this invention.

BACKGROUND OF THE INVENTION

1. Field of the Invention

This invention relates to attitude estimation and motion compensation for real-time image processing on a moving platform, possibly in combination with real-time active stabilization of the image sensor.

2. Description of the Related Art

Image sensors are mounted on moving platforms such as missiles, aircraft, terrestrial vehicles, ships, spacecraft or hand-held devices such as video cameras, binoculars etc. The image sensor may be either fixed to the moving platform or mounted on a single or multi-axes gimbal. In many applications, the sensor line-of-sight (LOS) must be both measurable and controllable in real-time. The moving platform, gimbal or sensor optics may be actively stabilized in real-time to, for example, maintain the sensor LOS on a target.

An Inertial Measurement Unit (IMU) that is rigidly mounted to the moving platform provides discrete measurements of angular rate of motion of the platform. These measurements are integrated into raw attitude estimates (e.g., yaw-pitch-roll Euler angles, direction cosine matrix, quaternions, or some equivalent). The IMU, hence the raw attitude estimates S(hT) where h is an integer clock index and T is the sampling period, will exhibit a latency L of a few to several clock samples, and not necessarily an integer multiple. The raw attitude estimate for the current sample has an error associated with this latency, the greater the latency the greater the error on average. Because the moving platform, gimbal and/or optics are actively stabilized in real-time at the sampling rate of the IMU, the active stabilization system cannot wait for the latent raw attitude estimate.

To reduce the error (on-average) of the attitude estimate for the current time sample, systems implement a prediction filter that extrapolates forward in time to compensate for the latency of the IMU measurements. The prediction filter processes a trailing window of the raw attitude estimates up to the current sample and extrapolates forward in time to generate a causal attitude estimate A(hT|hT). The causal attitude estimate A(hT|hT) reads as the estimate of attitude A at discrete time hT given all information available up to time hT. The prediction filter is and must be "causal" in the sense that only raw attitude estimates S(hT), S((h−1)T), S((h−2)T) . . . available at the current time sample (hT) can be processed to generate the attitude estimate A(hT|hT) for the current time sample hT. Again the active stabilization system cannot wait to accommodate the latency of the IMU. U.S. Pat. No. 7,729,816 describes an example of a causal prediction filter, referred to therein as a "lead filter" for active stabilization of a sensor LOS on a satellite.

In many of these same applications, the images captured by the image sensor are motion compensated in real-time to account for changes in sensor LOS. Motion compensation consists of using attitude estimates to compensate (e.g. shift) the images to compensate for relative motion of the sensor LOS from image-to-image so that the sensor can properly reconstruct the true inertial LOS to a distant target. For example, a stationary target in a scene may appear to move due to changes in sensor LOS. Motion compensation removes this non-scene motion. Real-time motion compensation may be performed to support closed-loop applications such as target acquisition, identification or tracking, to accommodate limited memory or processor resources or to stream the video signal to a memory device. The active stabilization system provides the causal attitude estimate A(hT|hT) to the image processing system, which is down sampled to the imaging rate (A(kMT|kMT) where M is the down sampling factor, to perform the motion compensation. On average, the error of the predicted attitude estimate A(hT|hT) will be less than the error of the raw attitude estimate S(hT) at current time sample hT.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an attitude estimator for providing non-causal attitude estimates for real-time motion compensation of images on a moving platform. The attitude estimator implements a non-causal filter that processes uncompensated attitude samples S(hT) received at a high rate clock from an IMU with latency L to provide an attitude estimate A(kMT|(kM+N)T) that is strictly non-causal at the IMU measurement level but satisfies a just-in-time (JIT) criteria J for real-time motion compensation of images I(kMT) captured at a low rate clock where N is the lag added by the filter and M is greater than one. Due to the latency L inherent in the IMU, on-average the error of the non-causal attitude estimate A(kMT|(kM+N)T) is less than the error of a causal attitude estimate A(kMT|kMT), which is less than the error of an uncompensated attitude sample S(kMT). If the lag N added by the non-causal filter is greater than the latency L, the effective transfer function of the non-causal filter has a negative gain slope that attenuates high frequency measurement noise of the uncompensated attitude samples. The attitude estimator may also implement a causal filter to generate a causal attitude estimate A(hT|hT) for real-time active stabilization of the platform at the high rate clock. In this case, both the causal and non-causal attitude estimates are available in time to support real-time processing at the respective high and low rate clocks.

In an embodiment, an IMU provides uncompensated attitude samples S(hT) of the moving platform at a high rate clock with a sampling period T and a clock index h. The samples S(hT) are received from the IMU with a latency L. An image sensor captures images I(kMT) at a low rate clock with a sampling period MT where M is greater than one and k is clock index. Each image capture includes an integration period followed by a readout period. A center of integration (COI) (or its equivalent) is synchronized to the low rate clock. An image processor initiates real-time motion compensation on the captured image I(kMT) at the end of the readout period at a just-in-time constraint J after the COI so that the compensated images may be displayed, processed or transferred to a storage card in real-time. An attitude estimator comprises a non-causal sampling clock and a non-causal filter that is synchronized to that clock. The non-causal sampling clock corresponds to the low rate clock kMT delayed by N high rate clock samples where N is less than or equal to J. The non-causal filter filters the uncompensated attitude samples S(hT) including at least one sample received after the COI to provide a non-causal attitude estimate A(kMT|(kM+N)T) for the previous COI that is delayed by N−L high rate samples and synchronized to the non-causal sampling clock. The image processor uses the non-causal attitude estimate A(kMT|(kM+N)T), which is available in time to satisfy the JIT criteria J, to initiate motion compensation on the captured image I(kMT).

These and other features and advantages of the invention will be apparent to those skilled in the art from the following detailed description of preferred embodiments, taken together with the accompanying drawings, in which:

DETAILED DESCRIPTION OF THE INVENTION

Figure 1:
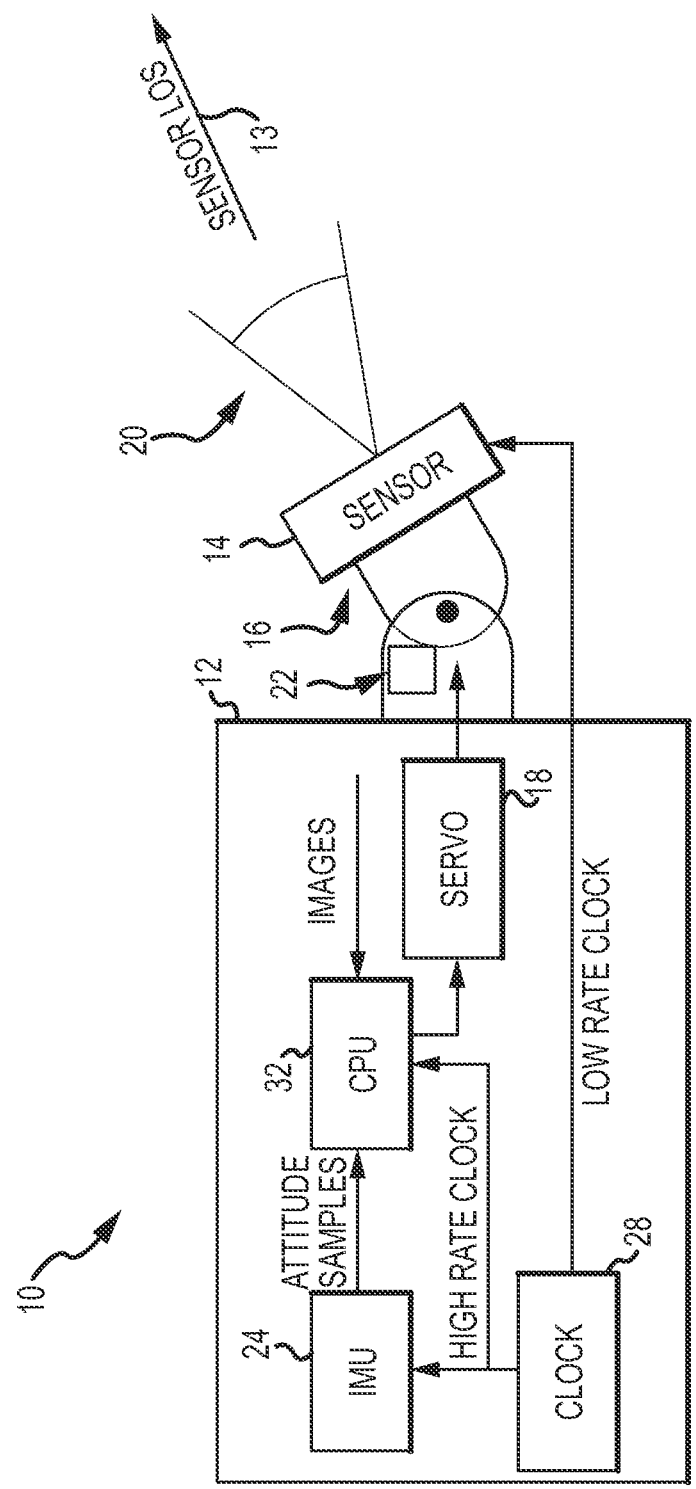
FIG. 1 is a diagram of an imaging platform in which attitude estimates are used to actively stabilize the orientation of an image sensor and to motion compensate sensed images.

Real-time motion compensation of images captured on a moving platform requires the formation of attitude estimates that are both accurate and timely from an IMU with some known, predictable error characteristics. In particular, IMU latency—if not compensated—causes significant errors when the platform mounting the IMU undergoes dynamic motion. When the IMU latency is well characterized and relatively repeatable, its effects can be compensated. For frequencies the moving platform can achieve or experience, the IMU's phase response can be approximated as linear with a negative slope, which is equivalent to a latency. Depending on how and when this motion compensation is performed, errors due to IMU noise can be either amplified or attenuated. Poor compensation for the IMU latency can result in multiple deleterious effects, including (a) the inability of the image processing system to correctly associate (i.e., correlate) observed objects over time, which in turn results in confusion about how many objects are actually present, etc.; and, (b) false conclusions regarding the inertial motion of observed objects, such as stationary objects appearing to move, etc.

Motion compensation for latency is accomplished by using a sequence of attitude estimates to estimate the actual attitude at the moment of interest. In strictly causal implementations, this entails using the trend (i.e., the rate of change) of the attitude measurements to extrapolate forward in time to counteract the effects of latency. In non-causal implementations, this can additionally involve shifting the measurements in time to partially or completely compensate for the latency. In addition, motion compensation for noise can be accomplished by filtering or smoothing the sequence of attitude measurements. These techniques can be combined. so that the latency compensation does not unduly amplify noise; that said, in strictly causal implementations compensation for latency is at odds with compensation for noise.

Motion compensation for latency that involves real-time image processing on a moving platform must not delay the onset of the processing. By definition non-causal filters that generate an estimate for a time t process data measurements that occur after time t and thus the estimate is not available until after time t e.g. A(t|t+delay). In many applications, a delay in formation of the estimate produces a delay in downstream processing.

An important (although undesired) feature of the image sensor is the fact that the integration and readout of the captured image takes a finite amount of time and the image is therefore latent; this latency is typically in excess of the IMU latency. We take advantage of the latency of the image sensor by designing a non-causal filter that intentionally delays the formation of the attitude estimate by an amount of time that is preferably greater than the IMU latency and is no greater than the latency of image capture. The non-causal filter both improves the accuracy of the attitude estimate and attenuates high frequency measurement noise without otherwise negatively effecting system performance.

The attitude estimator implements a non-causal filter that processes uncompensated attitude samples received with a latency L from an IMU at a high rate clock to provide an attitude estimate that is strictly non-causal at the IMU measurement level but satisfies a just-in-time (JIT) criteria J for real-time motion compensation of images captured at a low rate clock. Due to the latency inherent in the IMU, on average (i.e. averaged over time for multiple attitude estimates) the error of the non-causal attitude estimate is less than the error of a causal attitude estimate, which is less than the error of an uncompensated attitude sample. If the lag N added by the non-causal filter is greater than the latency L, the effective transfer function of the non-causal filter has a negative gain slope that attenuates high frequency noise of the uncompensated attitude samples. The attitude estimator may also include a causal filter to generate a causal attitude estimate for real-time active stabilization of the platform at the high rate clock. In this case, both the causal and non-causal attitude estimates are available in time to support real-time processing at the respective high and low rate clocks for active stabilization and image processing.

Without loss of generality, the attitude estimator will be shown and described in context of an image sensor that is gimbal-mounted on a moving platform. It will be understood by those skilled in the art that image sensor may be fixed to the moving platform. The attitude estimator is configured with both a causal filter for providing causal attitude estimates to support active stabilization of the image sensor by stabilizing the gimbal and/or platform at a high rate clock and a non-causal filter for providing attitude estimates to support motion compensation of images captured by the image sensor at a low rate clock. Platforms such as missiles, aircraft, terrestrial vehicles, ships, spacecraft and perhaps binoculars or hand-held cameras use actively stabilization to correct image formation. If the image sensor is fixed to the platform, a stabilizer actively controls the orientation of the platform. If the image sensor is mounted on a gimbal, a stabilizer may actively control only the gimbal or different stabilizers may be used to control both the gimbal and the platform. Platforms such as hand-held video cameras are not actively stabilized and thus do no require the causal filter.

In the illustrated embodiments, the low rate clock is provided by down sampling the high rate clock hT by a factor "M" greater than one, typically an integer. This is simple and keeps the low and high rate clocks synchronized to a fraction of a high rate clock period. Alternately, the high rate clock could be obtained by upsampling the low rate clock. Or the clocks may be generated asynchronously and time aligned through other means. In many cases, the non-causal filter is implemented in order to process just a few more uncompensated attitude samples to get an improved attitude estimate for motion compensation. To realize this improvement, the non-causal attitude estimate A(kMT|(kM+N)T) is typically synchronized to the high rate clock with an error of less than one high rate clock cycle.

In the illustrated embodiments, as is common practice, the COI of the image sensor is synchronized to the low rate clock e.g. the COI occurs at a transition of the clock. Equivalently, the leading or trailing edges of the integration period or reference points outside the integration period could be synchronized to the low rate clock.

Figure 2:
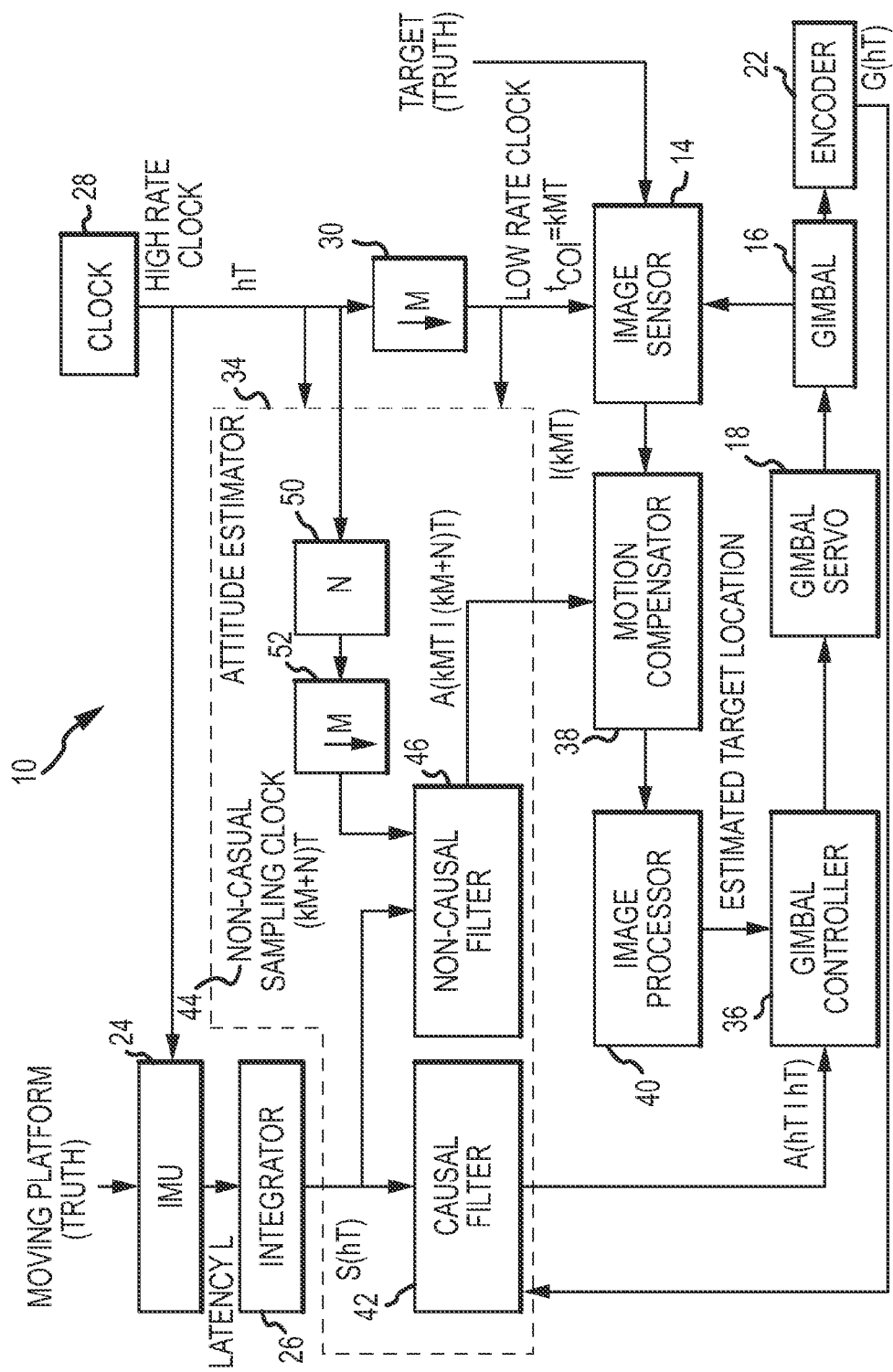
FIG. 2 is a block diagram of systems on the imaging platform that generate causal attitude estimates to actively stabilize the orientation of the image sensor at a high rate clock and generate non-causal attitude estimates to motion compensate sensed images at a low rate clock.

Referring now to FIGS. 1 and 2, a system 10 is tasked with capturing and processing a sequence of images of a scene or particular target in the scene from a moving platform 12 such as a missile, aircraft (manned or unmanned), terrestrial vehicle, ship or spacecraft. To perform this task effectively, real-time active stabilization maintains a desired sensor line-of-sight (LOS) 13 to stabilize image formation and real-time motion compensation removes any residual errors in the sensor LOS of the captured images. Active stabilization and motion compensation require both accurate and timely attitude estimates of the moving platform in one to three degrees of freedom e.g. Azimuth, Elevation and Roll.

In an embodiment, system 10 includes an image sensor 14 that is mounted on a single or multi-axis gimbal 16 mounted on moving platform 12. A gimbal servo 18 slews gimbal 16 to point the sensor along sensor LOS 13 to capture a sequence of images over a field-of-view (FOV) 20. The sensor may capture images in the visible, IR (SWIR, NIR, MWIR, LWIR), UV or RF bands. A gimbal encoder 22 measures the position of gimbal 16 relative to platform 12.

An Inertial Measurement Unit (IMU) 24 rigidly mounted to platform 12 typically outputs a sequence of angular rate measurements of the moving platform. An integrator 26 integrates the sampled measurements into uncompensated attitude estimates (e.g., yaw-pitch-roll Euler angles, direction cosine matrix, quaternions, or some equivalent).

A clock 28 provides a discrete high rate clock hT where T is the sampling period and h is an integer clock index 1, 2, 3, . . . . The IMU measurements are sampled and integrated at the high rate clock hT to form uncompensated attitude estimates S(hT). Each estimate S(hT) has a latency of L high rate clock samples, which may or may not be of integer values. The high rate clock hT is down sampled by a factor M 30, which is greater than one and typically an integer, to form the low rate clock kMT where k is an integer clock index 1, 2, 3, . . . , and M is the ratio of the sampling period of the low rate clock to the sampling period T of the high rate clock. M is typically between 10 and 20. Image sensor 14 captures images I(kMT) at the low rate clock and synchronizes the COI to the low rate clock so that $t_{COI}=kMT$. The low rate clock is often referred to as the "COI clock".

One or more CPUs 32 implement an attitude estimator 34 that provides two compensated attitude estimates in real time. The gimbal position G(hT) is added to each estimate. The first is a causal attitude estimate A(hT|hT) that compensates the latency of the IMU measurements by extrapolating forward in time. This estimate is generated at the high rate clock and is provided to a gimbal controller 36 to control gimbal servo 18. The second is a non-causal attitude estimate A(kMT|(kM+N)T) that provides the compensated estimate after a short delay. This estimate is generated for the moment of interest at the COI synchronized to the low rate clock and is provided to a motion compensator 38 to motion compensate the images I(kMT) that are then provided to image processor 40. In this embodiment, the image processor generates an estimated target location that is forwarded to gimbal controller 36. The "short delay" following the COI is both sufficiently long to improve the quality of the attitude estimate for motion compensation and short enough that the estimate is available by the time it is needed by the motion compensator without causing any further processing delay. Therefore, an attitude estimate that is non-causal at the measurement level of the IMU can be used to support real-time processing at the processing level of the motion compensator. The non-causal attitude estimate cannot be used for the active gimbal stabilization process because the stabilization process is real-time at the measurement level.

Referring to FIG. 2, attitude estimator 34 includes a causal filter 42, a non-causal sampling clock 44 and a non-causal filter 46. Causal filter 42 filters only uncompensated attitude samples received at or prior to cycle of the high rate clock hT to provide a causal attitude estimate A(hT|hT) synchronized to the high rate clock that is immediately available at each high rate clock cycle hT. The causal filter extrapolates L high rate clock samples forward in time to form the estimate. The causal filter is required to remove the latency (i.e., the group delay), L, inherent in the IMU-measurement samples at low frequencies. Any filter with a group delay of −L at low frequencies will suffice; equivalently, the phase response needs to have a positive slope that is exactly the opposite of the IMU's phase response. Such a filter is commonly called a lead filter and will necessarily boost high frequency noise (and boost it more as L increases). The non-latent gimbal positions G(hT) are summed with the output of the causal filter.

Non-causal sampling clock 44 corresponds to the low rate clock kMT delayed by N high rate clock samples where N is less than or equal to the JIT constraint J. Clock 44 is suitably provided by delaying the high rate clock hT by a delay 50 of N high rate clock samples and then down sampling by a factor M 52. Non-causal filter 46 filters the uncompensated attitude samples S(hT) including at least one sample received after the COI to provide a non-causal attitude estimate A(kMT|(kM+N)T) for the previous COI that is delayed by N−L high rate samples. The non-causal filter is synchronized to the non-causal sampling clock 44 to delay sampling of the filter output by N high rate samples. The attitude estimate is sampled at (kM+N)T to provide the non-causal attitude estimate for the moment of interest at the COI corresponding to kMT. The delay N is bounded by the JIT constraint J to ensure that the non-causal attitude estimate is available for real-time motion compensation.

The non-causal filter is required to add latency to the signal equal to N−L high rate clock samples. If N<L, the non-causal filter is a prediction filter similar to the causal filter although the number of high rate samples that must be extrapolated forward in time is reduced, hence the error is less. If N>L, the non-causal filter is an interpolator such as a low-pass filter. As N−L increases, the interpolator functions more effectively to provide a better estimate of the true attitude and to attenuate high frequency noise of the measurement samples. If N=L and the filter has a width of one, the filter provides the uncompensated attitude sample delayed by L as the attitude estimate. This removes the latency error but does not reduce noise. On average, extrapolation (i.e., prediction) of any quantity (attitude in our case) will result in greater errors than interpolation. The former is more sensitive to changes in the trend of the data as well as to noise. Likewise, the further one must extrapolate into the future, the more error will be present, on average. Consequently, reducing the amount of extrapolation (i.e., reducing how far into the future one must predict) is beneficial. The non-latent gimbal positions G(hT) are delayed by N and summed with the output of the causal filter.

Figure 3:
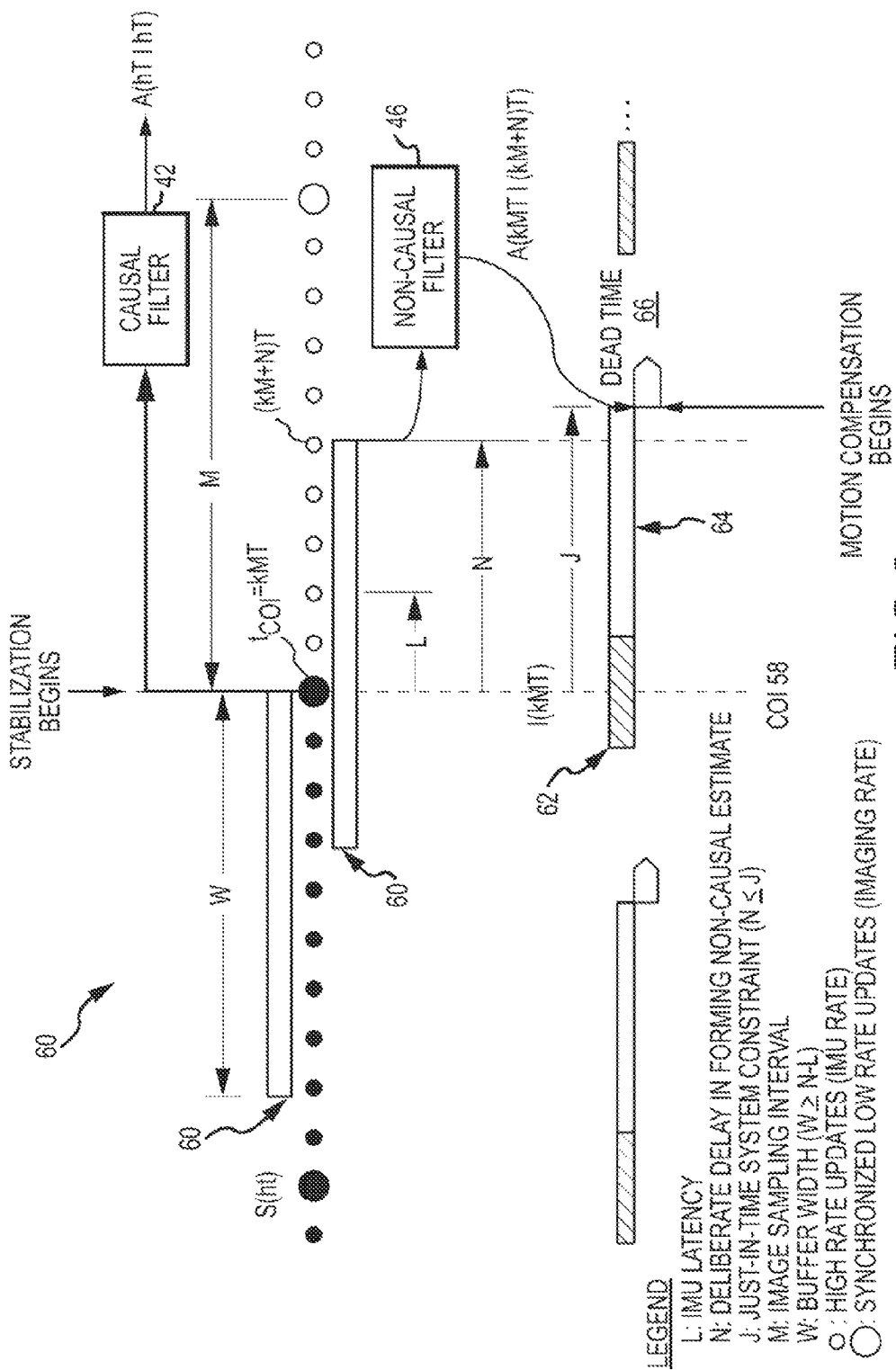
FIG. 3 is a diagram of an embodiment of an attitude estimator for generating both the causal attitude estimate at the high-rate clock and the non-causal attitude estimate at the low-rate clock that is synchronized to the center of integration (COI) of the image sensor.
Figure 4:
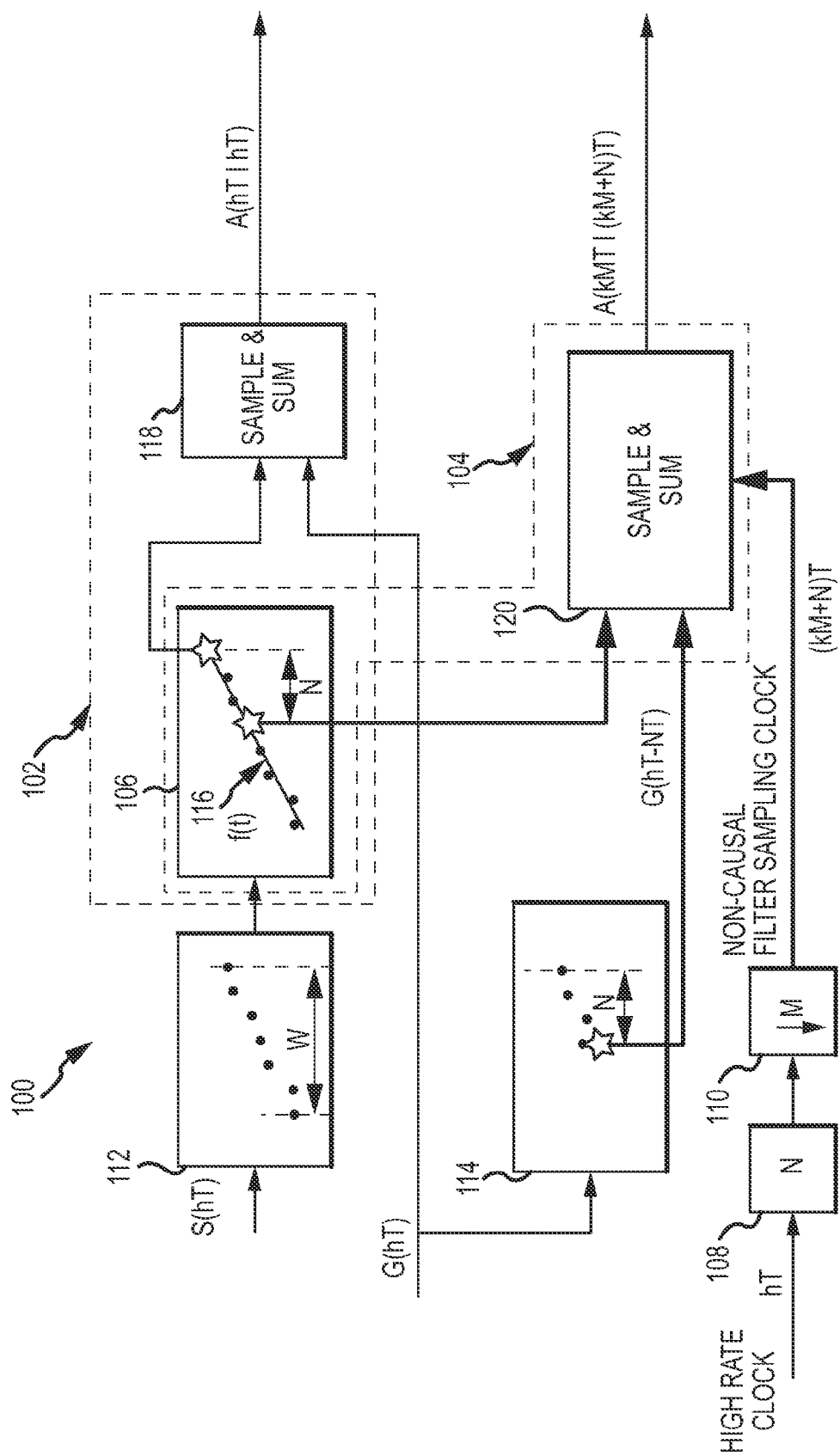
FIG. 4 is a block diagram of an embodiment of the attitude estimator in which the causal and non-causal filter sample the output of a high-rate attitude trend filter at sample times hT and hT−N to generate the causal and non-causal attitude estimates. respectively.

Referring now to FIG. 3, consider the causal attitude estimate A(hT|hT) and non-causal attitude estimate A(kMT|(kM+N)T) for a moment of interest $t_{COI}$ corresponding to the COI 58 of an image e.g. the low rate update kMT coincides with the high rate update hT (which occurs every M high rate samples). The uncompensated attitude samples S(hT) pass through a rolling buffer 60, which is shown at both $t_{COI}$ and $t_{COI}$+NT=(kM+N)T. The buffer has a width W greater than or equal to N−L. In this embodiment, the IMU latency L is less than or equal to the deliberate delay N in forming the non-causal estimate, which is less than or equal to the JIT constraint J, which is less than the down sampling interval M.

Active stabilization begins at each high rate update hT. The attitude estimate for hT must therefore be available at hT. As shown the samples S(hT) in buffer 60 at $t_{COI}$=hT=kMT are made available to causal filter 42 to generate causal estimate A(hT|hT). As buffer 60 rolls forward in time one high rate update at a time, the causal estimate is output for each high rate update.

Motion compensation begins J high rate samples after each low rate update kMT. Therefore, the attitude estimate for the COI of image I(kMT) at update kMT must be available at (kM+J)T. The latency of image capture (e.g. the end of the readout period), establishes the just-in-time (JIT) constraint J by which the attitude estimate must be available. Image capture includes a sensor integration period 62, a readout period 64 and a certain amount of dead time 66. "J" is measured in high rate clock samples equal to one-half the integration period 62 plus the readout period 64 and may or may not be integer valued. If the integration period 62 is fixed, J is fixed. If the integration period 62 varies, J varies. The COI remains fixed and synchronized to the low rate clock even if the integration period is allowed to vary. As long as the attitude estimate is available by (kM+J)T there is no downside at the system level: to the contrary, the system performance is improved by the non-causal estimate. If J is fixed, N may be set equal to J in order to process the maximum number of samples to form the non-causal estimate. If J varies, N may be set equal to the readout period to ensure that N is less than J.

As shown the samples S(hT) in buffer 60 at $t_{COI}$=(kM+N)T are made available to non-causal filter 46 to generate non-causal attitude estimate A(kMT|(kM+N)T). The non-causal attitude estimate may also be expressed as A($t_{COI}$|$t_{COI}$+NT), which reads as the estimate of attitude A at the COI given all information available up to time COI plus NT. As buffer 60 rolls forward in time one high rate update at a time, the non-causal estimate is output for each low rate update corresponding to every M high rate updates. As shown, if N less than or equal to J, the non-causal attitude estimate is available by the time motion compensation begins at the end of the readout period 64.

Referring now to FIGS. 4 and 5a-5d, an embodiment of an attitude estimator 100 implements a causal filter 102 and a non-causal filter 104 using a shared attitude trend filter 106. Attitude trend filter 106 shifts the uncompensated attitude estimates S(hT) to offset for the IMU latency L and performs a linear fit of continuous function f(t) to the shifted estimates that extrapolates forward in time L high rate samples to the current high rate update hT and spans the past low rate update at hT−NT. The causal filter 102 samples the function f(t) at hT to produce the causal attitude estimate A(hT|hT) synchronized to the high rate clock. The non-causal filter 104 samples the function f(t) at hT−NT to produce the non-causal attitude estimate A(hT|hT−NT)=A(kMT|(kM+N)T)=A($t_{COI}$|$t_{COI}$+NT) synchronized to the low rate clock. The sample of function f(T) at hT−nT only provides the attitude estimate for the COI at every $M^{th}$ buffer update. Either the non-causal filter can sample the function f(t) at the high rate clock and only output every Mth attitude estimate or the non-causal filter can sample the function f(t) at low rate clock (offset by N high rate samples). Having this fitted trend in hand, the causal filter and non-causal filters differ only in the time which they pick off the attitude estimate; the former essentially extrapolates into the future and the latter chooses a time that is more in the middle of the buffered window.

More particularly, attitude estimator 100 includes a delay 108 that delays the high rate clock hT by N high rate samples and a sampler 110 that down samples the delayed high rate clock by a factor M to provide the non-causal filter sampling clock (kM+N)T. The uncompensated attitude samples S(hT) are buffered by a buffer 112 of width W that is least N high rate clock samples wide and suitably approximately twice N. The gimbal positions G(hT) are buffered by a buffer 114 whose width is at least N high rate clock samples. Alternately, a sample-and-hold circuit clocked by the low rate clock could be used to provide the delayed gimbal position. The data in the buffers is updated at each high rate clock update. Current time is at the far right of the buffers.

Attitude trend filter 102 shifts the uncompensated attitude estimates S(hT) in buffer 112 to offset for the IMU latency L and performs a linear fit of a continuous function f(t) 116 to the shifted estimates to both smooth the samples and provide a trend. One implementation of this is to conduct a standard least-squares line fit through the four-dimensional unit vectors describing the quaternion sequence representations of the attitude: higher-order or weighted fits are also possible, as are other representations of the attitude. The fit of function f(t) to the true attitude at the moment of interest will on average be better for points within the extent of the buffer (i.e. the non-causal estimate) than for points outside the extent of the buffer (i.e. the causal estimate).

Given a buffer width of W data points, the best estimate can be formed right in the center of those W points, assuming no discontinuities are feeding the system (such as a disturbance suddenly beginning). Hence, a width W=2N provides the best non-causal estimate. The ideal choice for W depends on the dynamics of the system being estimated and the noise properties of the sensor. (It is also possible to unequally weight the points in the buffer, as in a Finite Impulse Response (FIR) filter, to further optimize the system.) In general, an estimate with the window off-center—or in the extreme case shifted completely off to the side, as in prediction—will not work as well as if it were centered. That said, increasing W does reduce noise-induced errors in the estimate by 1/sqrt(W), so there is/may be an advantage to increasing W even if the result is that the buffer is no longer centered.

Causal filter 102 includes a sample and sum block 118 that samples function f(t) at each high rate clock update hT and sums that estimate of the platform attitude to the gimbal position G(hT) to provide the current causal estimate A(hT|hT) for active stabilization. This estimate is updated at every high rate clock update. Sample and sum block 118 may sample and sum any one or all of Azimuth, Elevation and Roll estimates.

Non-Causal filter 104 includes a sample and sum block 120 that samples function f(t) at each update of the non-causal filter sampling clock (kM+N)T and sums that estimate of the platform attitude to the gimbal position G(hT−NT) to provide the past non-causal estimate A(kMT|(kM+N)T) for the previous COI for motion compensation. This estimate is updated at the low rate clock offset by N high rate samples to provide an attitude estimate that satisfies the JIT constraint for motion compensation. Sample and sum block 120 may sample and sum any one or all of Azimuth, Elevation and Roll estimates.

Figure 5:
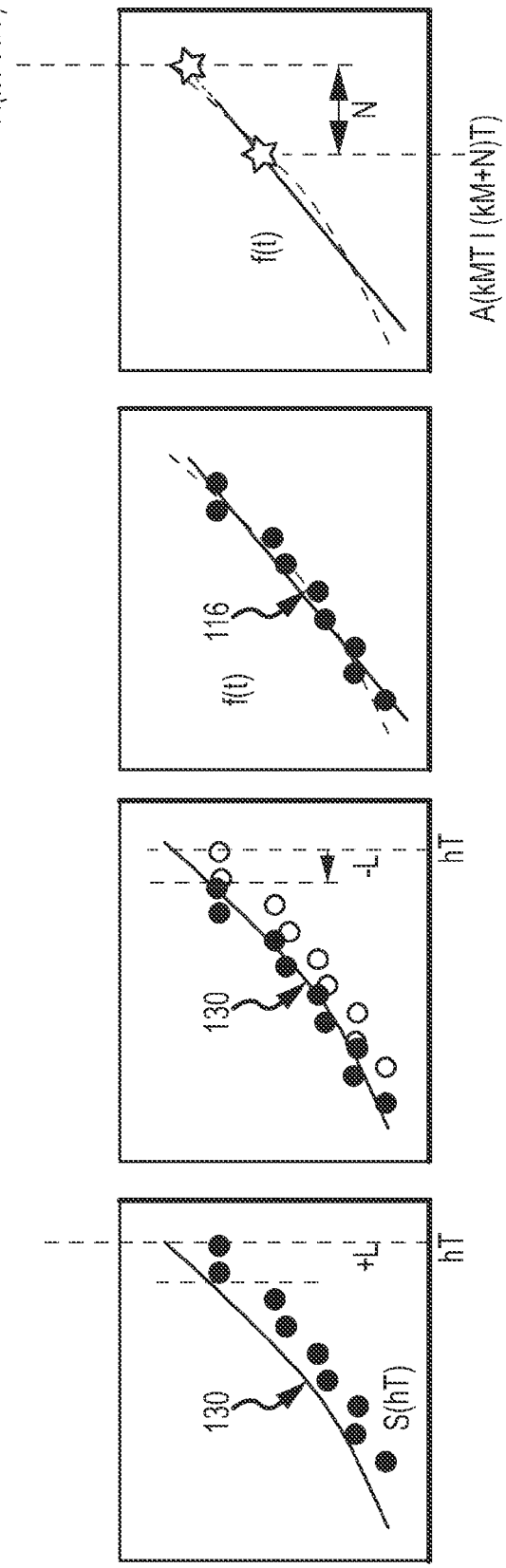
FIGS. 5a-5d are plots of the buffered attitude estimate data as it is processed by the attitude trend filter and then sampled to generate the causal and non-causal attitude estimates.

Referring now to FIGS. 5a-5d, the uncompensated attitude samples S(hT) are buffered and processed to provide the causal attitude estimate A(hT|hT) for each high rate clock update and the non-causal A(kMT|(kM+N)T) for each COI synchronized to the low rate clock. As shown in FIG. 5a, samples S(hT), S((h−1)T), S((h−2)T) and so forth are buffered and exhibit a latency of L high rate clock samples relative to the true attitude 130. The vertical offset between the curve shown and the dots represents the error incurred due to the latency. As shown in FIG. 5b, the samples have been shifted back in time by L high rate clock samples to correct for the known latency. The dots are now shown properly overlaying the true attitude curve 130, although the noise is still evident. As shown in FIG. 5c, the linear function f(t) 116 has been fit to the samples to approximate true attitude 130 and provide some smoothing of the noisy data. As shown in FIG. 5d, the causal and non-causal filters have sampled function f(t) at the current time hT to produce A(hT|hT) and at past time hT−nT=kMT to produce A(kMT|(kM+N)T). The causal prediction represents an extrapolation beyond the end of the available data.

The use of an attitude trend filter provides a couple benefits. First, the linear function f(t) can be used by both the causal and non-causal filters. Note, this approach can be used in applications that do not have a causal filter. Second, if the non-causal filter sampling clock and the high rate clock are not precisely synchronized, the non-causal filter can offset the time at which it samples the function f(t) and thus maintain the synchronization of the non-causal attitude estimate A(kMT+Δ|(kM+N)T) where A is the known offset to the high rate clock with an error of less than one high rate clock cycle. For example, the non-causal filter sampling clock may be fixed relative to the high rate clock but does not fall exactly on the transition of the high rate clock. Or the synchronization between the clocks has some jitter or other variation. As long as the variation is known, the non-causal filter can sample the appropriate time on the linear function f(t). Even if the sampling clock and high rate clock are asynchronous, as long as the relative alignment is known the non-causal filter can adjust the sample time on the linear function f(t). These adjustments cannot be made in real-time with a causal lead filter.

Figure 6:
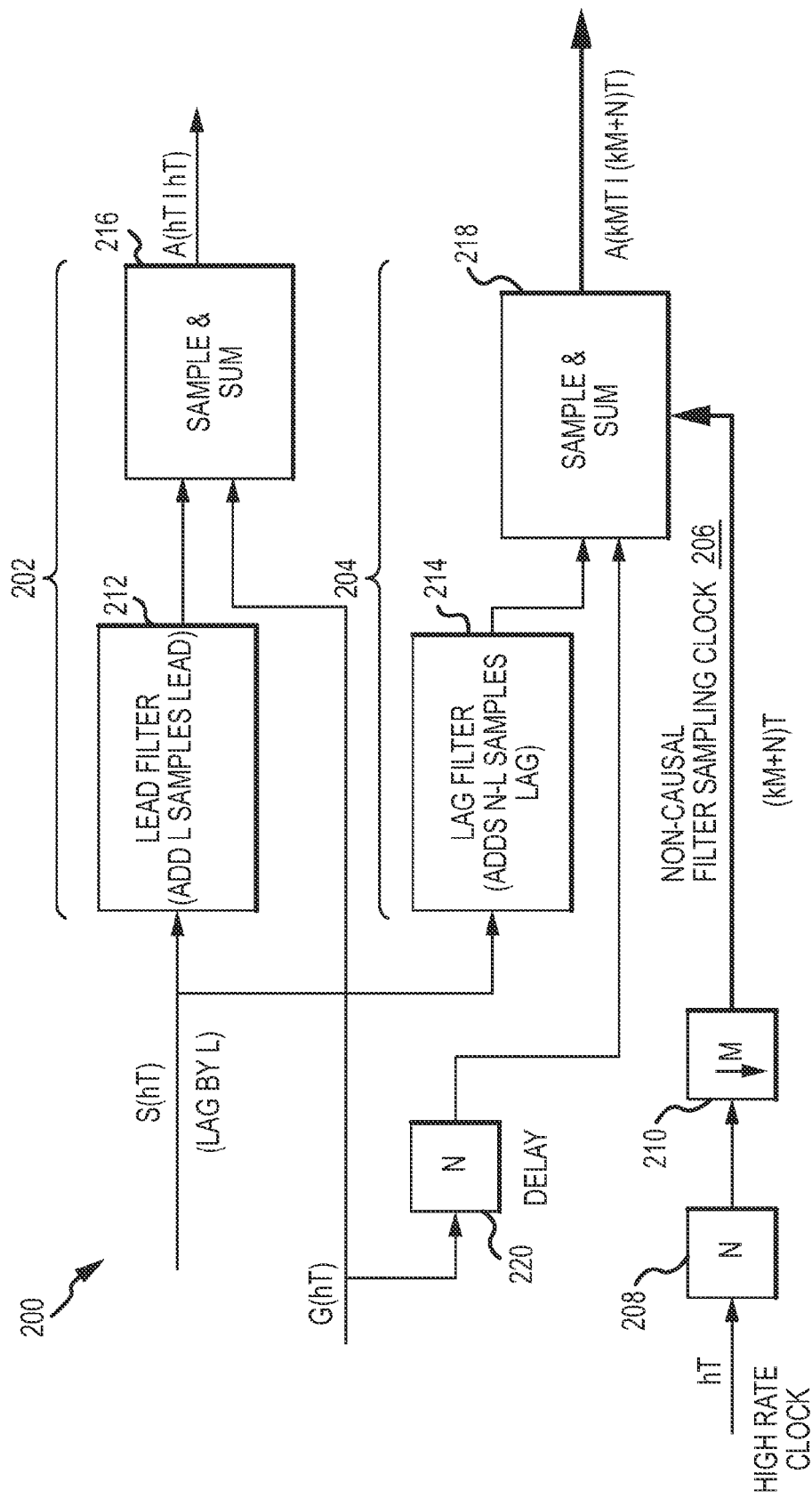
FIG. 6 is a block diagram of an embodiment of an attitude estimator including a causal lead filter and a non-causal low pass filter.

Referring now to FIG. 6, an embodiment of an attitude estimator 200 separately implements a causal filter 202 and a non-causal filter 204 to provide the causal attitude estimate A(hT|hT) at each high rate update and the non-causal attitude estimate A(kMT|(kM+N)T) at each update of the non-causal filter sampling clock 206 for the previous COI. Clock 206 is formed by delaying the high rate clock hT by a delay 208 of N high rate samples and then down sampling by a factor M 210.

Causal filter 202 comprises a lead filter 212 that adds L high rate clock samples of lead to provide a second estimate at the high rate clock and a sample and sum block 214 that samples the estimate at the high rate clock and sums it with the gimbal position G(hT) to provide the causal attitude estimate A(hT|hT). The causal filter extrapolates L high rate clock samples forward in time to form the estimate. The causal filter is required to remove the latency (i.e., the group delay), L, inherent in the IMU-measurement samples at low frequencies. Any filter with a group delay of −L at low frequencies will suffice; equivalently, the phase response needs to have a positive slope that is exactly the opposite of the IMU's phase response. Such a filter is commonly called a lead filter and will necessarily boost high frequency noise (and boost it more as L increases). One embodiment of a lead filter is given by output=input+L*derivative(input). The simplest imaginable result would be out[k]=in[k]+L*(in[k]−in[k−1]) equiv. out[k]=(1+L)*in[k]−L*M[k−1].

Non-causal filter 204 comprises a lag filter 216 that adds N−L high rate clock samples of lag to provide a first estimate and a sample and sum block 218 that samples the estimate at the non-causal filter sampling clock (kM+N)T and sums it with the gimbal position G(hT) delayed by N 220 high rate samples to provide the non-causal attitude estimate A(kMT|(kM+N)T). The lag filter is required to add latency to the signal in the amount of N−L samples. As N−L increases, the lag filter can filter more effectively. A simple embodiment of a lag filter is a moving-average filter with equal tap weights in which the output is given by: out[k]=(in[k]+in[k−1]+ . . . +in[k−2*(N−L)])/(2*(N−L)+1). For example, if N−L=2, out[k]=(in[k]+in[k−1]+in[k−2]+in[k−3]+in[k−4])/5.

Figure 7:
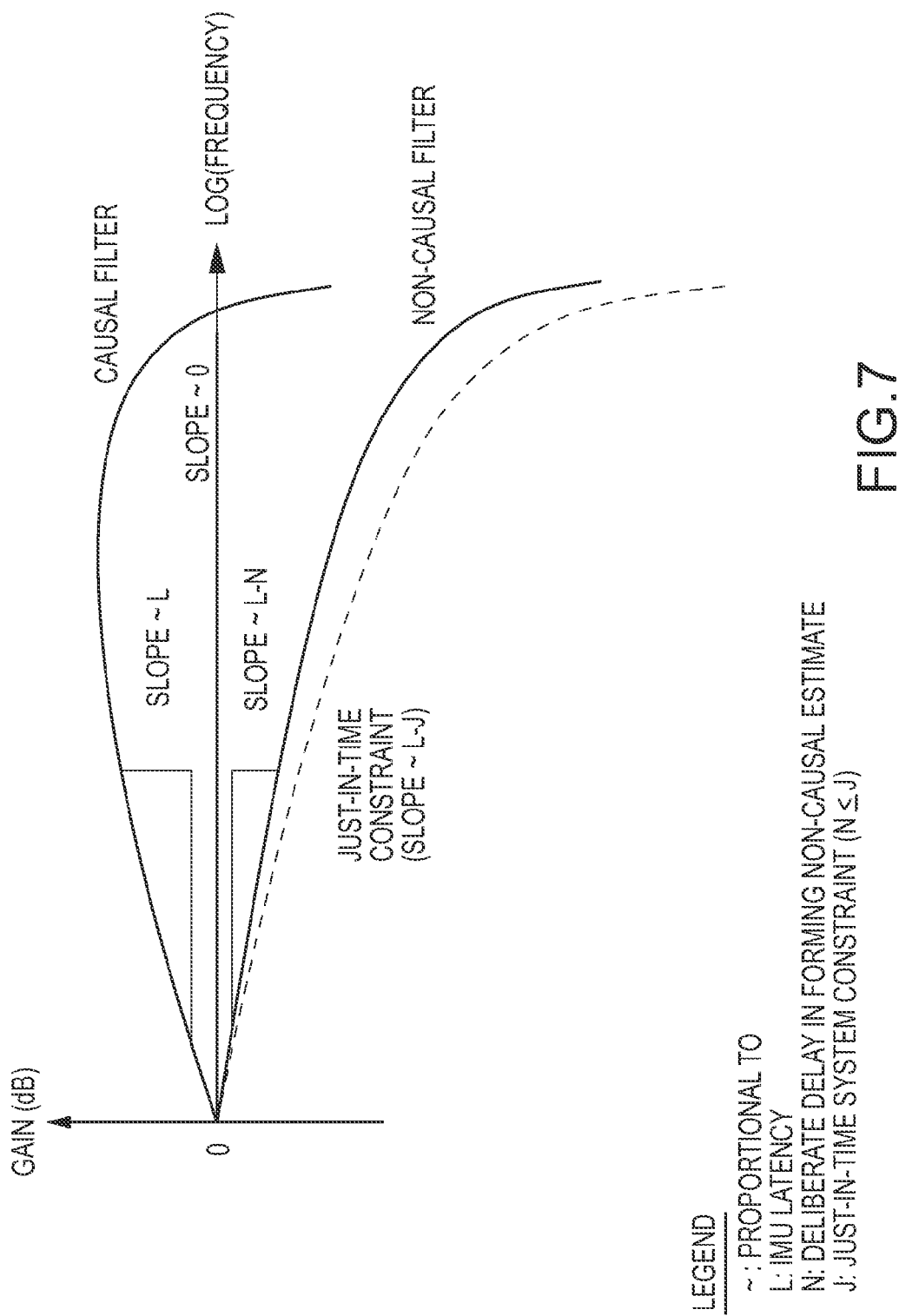
FIG. 7 is a plot of the transfer function for causal and non-causal attitude estimation.

Referring now to FIG. 7, an effective transfer function for latency compensation (gain vs. log (frequency)) is plotted for causal and non-causal filters.

As previously described, the phase of the causal filter will have a positive slope L that is exactly opposite of the IMU's phase response, which for frequencies of interest is approximated by the latency −L. As is evidenced by the transfer function, every causal filter will amplify the high frequency noise of the IMU measurements. The positive slope L, hence the amount of amplification increases with the latency L. The phase of the non-causal filter will have a slope of L−N. When L=N, which is the case of sampling the latent uncompensated estimate the gain is unity. When the deliberate delay N>L as is preferred, the slope is negative, which means the filter attenuates the high frequency noise of the IMU measurements. The maximum amount of attenuation is achieved when N=J.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An attitude estimator for providing attitude estimates for real-time motion compensation of images on a moving platform, wherein an IMU provides uncompensated attitude samples S(hT) of the moving platform at a high rate clock with a sampling period T and a dock index h, said samples S(hT) received with a latency L, an image sensor captures images O(kMT) at a low rate clock with a sampling period MT where M is greater than one and a clock index k, each image captured over an integration period having a center of integration (COI) at the center of the integration period synchronized to the low rare clock followed by a readout period, and a motion compensator that initiates real-time motion compensation on the captured image I(kMT) at the end of the readout period at a just-in-time constraint J measured in a number of high rate clock samples equal to one half the integration period plus the readout period after the COI, the attitude estimator comprising:
  a non-causal sampling clock corresponding to the low rate clock kMT delayed by N high rate clock samples where N is less than or equal to J; and
  a non-causal filter that filters the uncompensated attitude samples S(hT) including at least one sample received after the COI to provide a non-causal attitude estimate A(kMT|(kM+N)T) for the previous COI that is delayed by N−L high rate samples and synchronized to the non-causal sampling clock, said motion compensator using the non-causal attitude estimate A(kMT|(kM+N)T) to initiate motion compensation on the captured image I(kMT).

2. The attitude estimator of claim 1, wherein the non-causal attitude estimate A(kMT|(kM+N)T) is synchronized to the high rate clock with an error of less than one high rate clock cycle.

3. The attitude estimator of claim 1, wherein the uncompensated attitude samples S(hT) include errors due to measurement noise and the latency L, wherein on-average the non-causal attitude estimate A(kMT|(kM+N)T) includes less error than a causal attitude estimate A(kMT|kMT) which includes less error than the measured attitude estimate S(kMT) at current time sample kMT.

4. The attitude estimator of claim 1, wherein the JIT constraint J is greater than the latency L, said non-causal filter interpolating multiple uncompensated attitude samples to provide the non-causal attitude estimate A(kMT|(kM+N)T).

5. The attitude estimator of claim 4, where the delay N is greater than the latency L, said non-causal filter having an effective transfer function having a negative gain slope that attenuates high frequency noise of the uncompensated attitude samples.

6. The attitude estimator of claim 5, wherein the integration period is fixed and the delay N is equal to the JIT constraint J.

7. The attitude estimator of claim 6, wherein the integration period is variable and the delay N is no greater than the readout period.

8. The attitude estimator of claim 1, wherein the delay N equals the latency L, said non-causal filter sampling the uncompensated attitude sample at S(hT−NT) to provide the non-causal attitude estimate A(kMT|(kM+N)T).

9. The attitude estimator of claim 1, where the JIT constraint J is less than the latency L, said non-causal filter extrapolating from multiple uncompensated attitude samples to provide the a non-causal attitude estimate A(kMT|(kM+N)T).

10. The attitude estimator of claim 1, wherein the non-causal filter comprises:
  a low-pass filter that adds N−L high rate clock samples of lag to provide an estimate at the high rate clock; and
  a sampler that samples the estimate at the non-causal sampling clock to provide the non-causal attitude estimate A(kMT|(kM+N)T).

11. The attitude estimator of claim 1, wherein the non-causal filter comprises:
  a buffer of width W greater than N that receives the uncompensated attitude samples S(hT) with latency L;
  an attitude trend filter that shifts the uncompensated attitude samples in the buffer by latency L and fits a continuous function f(t) to the shifted uncompensated attitude samples at the high rate clock; and
  a sampler that samples the continuous function f(t) at the non-causal sampling clock to provide the non-causal attitude estimate A(kMT|(kM+N)T).

12. The attitude estimator of claim 1, wherein a stabilizer actively stabilizes attitude errors in orientation of the image sensor in real-time at the high rate clock, further comprising:
  a causal filter that filters only uncompensated attitude samples received at or prior to hT of the high rate clock to provide a causal attitude estimate A(hT|hT) synchronized to the high rate clock, said stabilizer using the causal attitude estimate A(hT|hT) to actively stabilize the orientation of the image sensor at the high rate clock.

13. The attitude estimator of claim 12, wherein the uncompensated attitude samples include errors due to measurement noise and the latency L of receiving the samples, wherein on-average the non-causal attitude estimate A(kMT|(kM+N)T) includes less error than the causal attitude estimate A(hT|hT) which includes less error than the measured attitude estimate S(hT) at current time sample hT.

14. The attitude estimator of claim 12, wherein the non-causal filter comprises a low-pass filter that adds N−L high rate clock samples of lag to provide a first estimate at the high rate clock and a first sampler that samples the first estimate at the non-causal sampling clock to provide the non-causal attitude estimate A(kMT|(kM+N)T) and the causal filter comprises a lead filter that adds L high rate clock samples of lead to provide a second estimate at the high rate clock and a second sampler that samples the second estimate at the high rate clock to provide the causal attitude estimate A(hT|hT).

15. The attitude estimator of claim 12, wherein the non-causal and causal filters comprises:
  a buffer of width W greater than N that receives the uncompensated attitude samples with latency L;
  an attitude trend filter that shifts the uncompensated attitude samples in the buffer by latency L and fits a continuous function f(t) to the shifted uncompensated attitude samples at the high rate clock;
  a first sampler that samples the continuous function f(t) at the non-causal sampling clock to provide the non-causal attitude estimate A(kMT|(kM+N)T); and
  a second sampler that samples the continuous function f(t) at the high rate clock to provide the causal attitude estimate A(hT|hT).

16. An attitude estimator for providing attitude estimates for real-time motion compensation of images on a moving, platform and for real-time active stabilization of the platform, wherein an IMU provides uncompensated attitude samples S(hT) of the moving platform at a high rate clock, with a sampling period T and a clock index h, said samples S(hT) received with a latency L, an image sensor captures images I(kMT) at a low rate clock with a sampling, period MT where M is greater than one and a clock, index k, each image captured over an integration period having a center of integration (COI) at the center of the integration period synchronized to the low rate clock followed by a readout period, and a motion compensator that initiates real-time motion compensation on the captured image I(kMT) at the end of the readout period at a just-in-time constraint J measured in a number of high rate clock samples equal to one half the integration period plus the readout period after the COI, and a stabilizer that actively stabilizes attitude errors in orientation of the image sensor in real-time at the high rate clock, the attitude estimator comprising:

a causal filter that filters only uncompensated attitude samples received at or prior to hT of the high rate clock to provide a causal attitude estimate A(hT|hT) synchronized to the high rate clock, said stabilizer using the causal attitude estimate A(hT|hT) to actively stabilize the orientation of the image sensor at the high rate clock;

a non-causal sampling clock corresponding to the low rate clock kMT delayed by N high rate clock samples where N is less than or equal to J; and a non-causal filter that filters the uncompensated attitude samples S(hT) including at least one sample received after the COI to provide a non-causal attitude estimate A(kMT|(kM+N)T) for the previous COI that is delayed by N−L high rate samples and synchronized to the non-causal sampling clock, said motion compensator using the non-causal attitude estimate A(kMT|(kM+N)T) to initiate motion compensation on the captured image I(kMT), wherein on-average the non-causal attitude estimate A(kMT|(kM+N)T) includes less error than the causal attitude estimate A(hT|hT), which includes less error than the measured attitude estimate S(hT) at current time sample hT.

17. The attitude estimator of claim 16, wherein the non-causal and causal filters comprises:

a buffer of width W greater than N that receives the uncompensated attitude samples with latency L;

an attitude trend filter that shifts the uncompensated attitude samples in the buffer by latency L and fits a continuous function f(t) to the shifted uncompensated attitude samples at the high rate clock;

a first sampler that samples the continuous function f(t) at the non-causal sampling clock to provide the non-causal attitude estimate A(kMT|(kM+N)T); and a second sampler that samples the continuous function f(t) at the high rate clock to provide the causal attitude estimate A(hT|hT).

18. A system comprising:

a moving platform;

an IMU rigidly mounted on the moving platform, said IMU providing uncompensated attitude samples S(hT) of the moving platform at a high rate clock with a sampling period T and a clock index h;

an image sensor that captures images I(kMT) at a low rate clock with a sampling period MT where M is greater than one and a clock, index k, each image captured over an integration period having a center of integration (COI) synchronized to the low rate clock followed by a readout period;

a motion compensator that initiates real-time motion compensation on the captured image I(kMT) at the end of the readout period at a just-in-time (JIT) constraint J measured in a number of high rate clock samples equal to one half the integration period plus the readout period after the COI; and an attitude estimator that receives uncompensated attitude samples S(hT) with a latency L, said attitude estimator comprising:

a non-causal sampling clock corresponding to the low rate clock kMT delayed by N high rate clock samples where N is less than or equal to J; and a non-causal filter that filters the uncompensated attitude samples S(hT) including at least one sample received after the COI to provide a non-causal attitude estimate A(kMT|(kM+N)T) for the previous COI that is delayed by N−L high rate samples and synchronized to the non-causal sampling clock at or before the JIT constraint J, said motion compensator using the non-causal attitude estimate A(kMT|(kM+N)T) to initiate motion compensation on the captured image I(kMT).

19. The system of claim 18, where the delay N is greater than the latency L, said non-causal filter having an effective transfer function having a negative gain slope that attenuates high frequency noise of the uncompensated attitude samples.

20. The system of claim 18, further comprising:

a causal filter that filters only uncompensated attitude samples received at or prior to hT of the high rate clock to provide a causal attitude estimate A(hT|hT) synchronized to the high rate clock; and a stabilizer that uses the causal attitude estimate A(hT|hT) to actively stabilize the orientation of the image sensor at the high rate clock.

* * * * *